United States Patent
Segami et al.

(10) Patent No.: US 12,221,517 B2
(45) Date of Patent: Feb. 11, 2025

(54) FIBER-REINFORCED POLYIMIDE RESIN MOLDING PRECURSOR AND METHOD FOR PRODUCING THE SAME

(71) Applicant: TOYO SEIKAN GROUP HOLDINGS, LTD., Tokyo (JP)

(72) Inventors: Kouta Segami, Yokohama (JP); Kazunobu Watanabe, Yokohama (JP); Yusuke Kobayashi, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 563 days.

(21) Appl. No.: 17/299,934

(22) PCT Filed: Dec. 9, 2019

(86) PCT No.: PCT/JP2019/048142
§ 371 (c)(1),
(2) Date: Jun. 4, 2021

(87) PCT Pub. No.: WO2020/116658
PCT Pub. Date: Jun. 11, 2020

(65) Prior Publication Data
US 2022/0049060 A1 Feb. 17, 2022

(30) Foreign Application Priority Data
Dec. 7, 2018 (JP) .................. 2018-229938

(51) Int. Cl.
*C08J 5/04* (2006.01)
*B29C 43/00* (2006.01)
(Continued)

(52) U.S. Cl.
CPC ............. *C08J 5/042* (2013.01); *B29C 43/003* (2013.01); *B29C 43/02* (2013.01); *B29C 43/52* (2013.01);
(Continued)

(58) Field of Classification Search
CPC ......... C08J 3/203; C08J 5/042; B29C 43/003; B29C 43/02; B29C 43/52; C08L 79/08; B29K 2307/04; B29K 2079/08
See application file for complete search history.

(56) References Cited

U.S. PATENT DOCUMENTS

| 6,359,107 B1 | 3/2002 | Connell et al. |
| 7,651,767 B2 | 1/2010 | Hirata et al. |

(Continued)

FOREIGN PATENT DOCUMENTS

| CN | 102015834 A | 4/2011 |
| CN | 103003332 A | 3/2013 |

(Continued)

OTHER PUBLICATIONS

Extended European Search Report dated Jul. 28, 2022, issued in corresponding European Application No. 19894001.7.
(Continued)

*Primary Examiner* — Camie S Thompson
(74) *Attorney, Agent, or Firm* — Sughrue Mion, PLLC

(57) ABSTRACT

The present invention provides a molding precursor for a fiber-reinforced polyimide resin molded article, which is formed by impregnating a functional fiber with an addition-reaction type polyimide resin. The molding precursor has a melt viscosity in the range of 300 to 3200 kPa·s under conditions of keeping for 1 to 10 minutes at a temperature 5 to 20° C. lower than the thickening-start temperature so as to effectively prevent a fiber-reinforced polyimide resin molded article from warping. The present invention provides also a method for producing the molding precursor.

14 Claims, 1 Drawing Sheet

(51) Int. Cl.
  *B29C 43/02* (2006.01)
  *B29C 43/52* (2006.01)
  *B29K 79/00* (2006.01)
  *B29K 307/04* (2006.01)

(52) U.S. Cl.
  CPC ...... *B29K 2079/08* (2013.01); *B29K 2307/04* (2013.01); *C08J 2379/08* (2013.01)

(56) References Cited

U.S. PATENT DOCUMENTS

| | | | |
|---|---|---|---|
| 7,767,302 | B2 | 8/2010 | Hirata et al. |
| 8,748,509 | B2 | 6/2014 | Ozawa et al. |
| 10,406,765 | B2 | 9/2019 | Watanabe et al. |
| 2007/0252986 | A1 | 11/2007 | Sandstrom et al. |
| 2011/0003955 | A1 | 1/2011 | Nishino et al. |
| 2013/0098656 | A1 | 4/2013 | Saito et al. |
| 2017/0252986 | A1* | 9/2017 | Watanabe ............... B29B 7/005 |
| 2018/0273798 | A1 | 9/2018 | Miyauchi et al. |

FOREIGN PATENT DOCUMENTS

| | | | | |
|---|---|---|---|---|
| CN | 105764989 | A | 7/2016 | |
| EP | 3192827 | A1 * | 7/2017 | ............ B29B 7/005 |
| EP | 3 604 408 | A1 | 2/2020 | |
| EP | 3718765 | A1 * | 10/2020 | ............ B29C 43/20 |
| JP | 2003-526704 | A | 9/2003 | |
| JP | 2006-117788 | A | 5/2006 | |
| JP | 2007-191658 | A | 8/2007 | |
| JP | 2009-242656 | A | 10/2009 | |
| JP | 4538502 | B2 | 9/2010 | |
| JP | 2016-060914 | A | 4/2016 | |
| JP | 2016-060915 | A | 4/2016 | |
| WO | WO-2018180930 | A1 * | 10/2018 | ............ B29C 70/06 |

OTHER PUBLICATIONS

International Search Report for PCT/JP2019/048142 dated Feb. 25, 2020 [PCT/ISA/210].

* cited by examiner

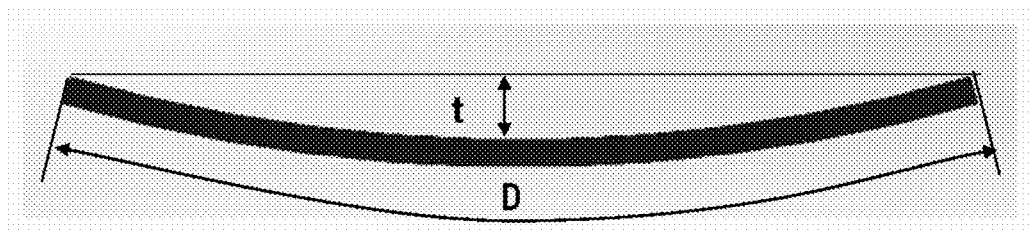

# FIBER-REINFORCED POLYIMIDE RESIN MOLDING PRECURSOR AND METHOD FOR PRODUCING THE SAME

CROSS REFERENCE TO RELATED APPLICATIONS

This application is a National Stage of International Application No. PCT/JP2019/048142 filed Dec. 9, 2019, claiming priority based on Japanese Patent Application No. 2018-229938 filed Dec. 7, 2018.

TECHNICAL FIELD

The present invention relates to a precursor for molding a fiber-reinforced polyimide resin molded article and a method for producing the same. More specifically, the present invention relates to a molding precursor that can be used to mold a fiber-reinforced polyimide resin molded article excellent in shape stability at the time of molding because warpage can be effectively prevented, and a method for producing the same. The present invention further relates to a fiber-reinforced polyimide resin molded article.

BACKGROUND ART

Molded articles formed of a fiber-reinforced resin prepared by blending in a resin a functional fiber such as a carbon fiber are excellent in properties such as weather resistance, mechanical strength and durability, and thus, the articles have been widely used for transportation equipment such as automobiles and aircraft, civil engineering and construction materials, sporting goods, and the like.

For instance, Patent document 1 below describes a carbon fiber-reinforced resin molded article comprising a specific pitch-based carbon short fiber mixture and a matrix resin. Patent document 1 describes further that the molded article is suitably used for various electronic components.

Further, Patent document 2 below proposes a friction material composed of a resin composition for friction material containing a specific aromatic polyimide oligomer as a binder for carbon fibers or the like. In a conventional technique, a phenol resin is preferably used as the binder for the friction material. According to the Patent document 2, the binder of the aromatic polyimide oligomer is excellent in heat resistance and mechanical properties in comparison with the conventional binder, and its moldability is favorable.

The fiber-reinforced resin molded article to be used as a slidable member like a bearing is required to have various properties. For instance, the article is required to have favorable strength and mechanical strength like rigidity. Furthermore, its dynamic friction coefficient is required to be low and its wear amount is required to be small, and its limit PV value is required to be high. The article is also required to contain, as the matrix resin, an addition-reaction type polyimide resin excellent in mechanical strength, heat resistance and durability and further excellent in the resin impregnation property.

An addition-reaction type polyimide resin proposed by Patent document 3 is a highly functional addition-reaction type polyimide resin from which a carbon fiber-reinforced composite can be produced by resin transfer molding (RTM) and resin injection (RI).

It may be possible to achieve excellent heat resistance, durability and mechanical strength by use of the addition-reaction type polyimide resin as a matrix resin of the fiber-reinforced resin molded article. However, the thus obtained molded article may be warped and cannot be put into practical use as a slidable member.

In order to solve this problem, the present inventors have proposed a resin molded article of an addition-reaction type polyimide resin containing a functional fiber dispersed uniformly therein and having a limit PV value of not less than 3000 kPa·m/s. The present inventors have proposed also a method for producing the resin molded article (Patent document 4).

PRIOR ART DOCUMENTS

Patent Documents

[Patent Document 1] Japanese Patent No. 4538502
[Patent Document 2] JP-A 2009-242656
[Patent Document 3] JP-A 2003-526704
[Patent Document 4] JP-A 2016-60914

SUMMARY OF THE INVENTION

Problem to be Solved by the Invention

The fiber-reinforced polyimide resin molded article obtained according to Patent document 4 has excellent sliding performance, and its warping degree is lower than that of a conventional article. However, from the viewpoint of productivity and economic efficiency, there is a demand for molded articles with much lower warping degree. In Patent document 4, the viscosity is adjusted by heating the polyimide prepolymer immediately before shaping for the purpose of preventing sedimentation of functional fiber and keeping the functional fiber uniformly dispersed in the matrix during the shaping. However, bubbles are generated and expand due to the heat applied to the polyimide prepolymer, and these bubbles are crushed by the pressure applied during the shaping so as to cause a flow of the prepolymer. As a result, the functional fiber is oriented, which is considered as causing warpage in the molded article.

Accordingly, an object of the present invention is to provide a molding precursor that can be used to effectively prevent warpage of the fiber-reinforced polyimide resin molded article, and a method for producing the same.

Another object of the present invention is to provide a method for producing a fiber-reinforced polyimide resin molded article having excellent sliding performance. The method enables to mold the article with favorable shape stability by effectively preventing flow orientation of the prepolymer.

Means for Solving the Problems

The present invention provides a molding precursor comprising a functional fiber impregnated with an addition-reaction type polyimide resin. The precursor has a melt viscosity in a range of 300 to 3200 kPa·s under conditions of keeping for 1 to 10 minutes at a temperature 5 to 20° C. lower than a thickening-start temperature of the addition-reaction type polyimide resin.

It is suitable in the molding precursor of the present invention that:
1. the addition-reaction type polyimide resin is a polyimide resin having a phenylethynyl group as an addition-reactive group;

2. the functional fiber is contained in an amount of 5 to 200 parts by weight relative to 100 parts by weight of the addition-reaction type polyimide resin;
3. the functional fiber is at least one selected from the group consisting of a carbon fiber, a glass fiber, an aramid fiber, and a metal fiber;
4. the functional fiber is a carbon fiber having an average fiber length in a range of 50 to 6000 μm and an average fiber diameter in a range of 5 to 20 μm; and
5. the molding precursor further comprises at least one of graphite, molybdenum disulfide, PTFE (polytetrafluoroethylene) resin, a fine carbon-based material, or a metal powder in an amount of 5 to 40 parts by weight relative to 100 parts by weight of the addition-reaction type polyimide resin.

The present invention provides further a method for producing a molding precursor, and the method comprises at least an impregnation step and a thickening step. The impregnation step comprises: preparing a mixture of a prepolymer of an addition-reaction type polyimide resin and a functional fiber, keeping the mixture for a certain time at a temperature not lower than the melting point and not higher than the thickening-start temperature of the addition-reaction type polyimide resin so as to impregnate the functional fiber with the addition-reaction type polyimide resin. The thickening step comprises: keeping the resin-impregnated fiber for a certain time at a temperature not lower than the thickening-start temperature of the addition-reaction type polyimide resin so as to increase melt viscosity of the resin-impregnated fiber to a range of 300 to 3200 kPa·s under conditions of keeping for 1 to 10 minutes at a temperature 5 to 20° C. lower than the thickening-start temperature.

It is suitable in the method for producing the molding precursor of the present invention that:
1. the melt viscosity of the resin-impregnated fiber is increased to a range of 300 to 3200 kPa·s by keeping the resin-impregnated fiber for a certain time at a temperature 15 to 45° C. higher than the thickening-start temperature of the addition-reaction type polyimide resin;
2. the functional fiber is contained in an amount of 5 to 200 parts by weight relative to 100 parts by weight of the addition-reaction type polyimide resin; and
3. the addition-reaction type polyimide resin is a polyimide resin having a phenylethynyl group as an addition-reactive group.

The present invention provides also a method for producing a resin molded article, and the method comprises a step of pulverizing-mixing the molding precursor so as to prepare a pulverized product, and a shaping step of shaping the pulverized product under conditions of a temperature not lower than the thickening-start temperature of the addition-reaction type polyimide resin.

It is suitable in the method for producing the resin molded article of the present invention that:
1. the method further comprises a preheating step between the pulverizing-mixing step and the shaping step, and the preheating step comprises keeping the pulverized product of the molding precursor for a predetermined time at a temperature not lower than the melting temperature and not higher than the thickening-start temperature; and
2. the shaping step is performed by compression molding.

The present invention provides further a resin molded article obtained by shaping the molding precursor. Here, the addition-reaction type polyimide resin is a matrix, and the functional fiber is dispersed in the matrix.

Effect of the Invention

In the molding precursor of the present invention, the melt viscosity is adjusted to the range of 300 to 3200 kPa·s under the conditions of keeping for 1 to 10 minutes at a temperature 5 to 20° C. lower than the thickening-start temperature of the addition-reaction type polyimide resin, and this allows the prepolymer to exhibit a viscosity in a suitable range in the step of shaping into the resin molded article. This makes it possible to crosslink-cure and shape while keeping the functional fiber dispersed uniformly in the resin. As a result, it is possible to produce a fiber-reinforced polyimide resin molded article with a good yield without distortion like warpage.

Further, the molding precursor of the present invention has a melt viscosity suitably adjusted at the molding temperature when it is shaped into a resin molded article, and thus, adjustment of viscosity immediately before the shaping is not necessary. This contributes to preventing bubbles and crushing both of which may occur when viscosity adjustment is performed by heating immediately before shaping. As a result, the resin molded article can be prevented effectively from warping caused by flow orientations of the prepolymer and the functional fiber.

Since the fiber-reinforced polyimide resin molded article formed from the molding precursor of the present invention is molded by crosslinking and curing in a state where functional fibers are uniformly dispersed in the molded article, substantially no distortion like warpage occurs. Therefore, an addition-reaction type polyimide resin excellent in heat resistance, durability and mechanical strength is used as the matrix resin and sliding performance can be exhibited.

BRIEF DESCRIPTION OF THE DRAWINGS

The FIGURE: an explanatory view of a method for measuring warping degrees in Examples.

MODE FOR CARRYING OUT THE INVENTION (Molding Precursor)

The molding precursor of the present invention is prepared by impregnating a functional fiber with an addition-reaction type polyimide resin. This can be provided in the form of a lump or a powdery bulk mold compound (BMC) prepared by pulverizing the lump. An important feature of the present invention is that this molding precursor has a melt viscosity in the range of 300 to 3200 kPa·s under conditions of keeping for 1 to 10 minutes at a temperature 5 to 20° C. lower than the thickening-start temperature of the addition-reaction type polyimide resin.

In the present specification, the thickening-start temperature is defined as follows.

A parallel plate is used in a rheometer. The temperature is increased at 4° C./min at an angular frequency of 100 rad/s. After reaching a predetermined target temperature, the viscosity of the addition-reaction type polyimide resin in an unreacted state is measured under conditions of keeping at the target temperature for a certain time. The raised temperature causes melting and lowers the viscosity. The lowest viscosity during the measurement is set as the lowest melt viscosity, and the melt viscosity by the time 120 minutes passing after reaching the target temperature is measured.

The melt viscosity is measured by setting the target temperature from a low temperature to higher temperatures at a multiple of 5. The time at which the lowest melt viscosity is shown is set as 0 minutes, which is plotted in a semi-logarithmic graph taking the time (min) in the horizontal axis and the melt viscosity (Pa·s) in the vertical axis, and the exponential approximation formula is obtained by the table calculation software. The temperature at which the value of B of the approximate formula shown in the following formula (1) exceeds 0.014 for the first time is set as the thickening-start temperature.

$$Y = A \exp(Bx) \tag{1}$$

Y: Melt viscosity (Pa·s), x: time (min), A and B: constants

[Addition-Reaction Type Polyimide Resin]

The addition-reaction type polyimide resin used in the present invention is formed of an aromatic polyimide oligomer having an addition-reactive group at its terminal. A resin prepared by a conventionally known method can be used therefor. The addition-reaction type polyamide resin can be easily obtained by using aromatic tetracarboxylic dianhydride, aromatic diamine and a compound having an addition-reactive group and either an anhydride group or an amino group in the molecule, such that the total of the equivalents of acid groups becomes substantially equal to the total of the equivalents of the respective amino groups, and suitably they are made to react in a solvent. One example of the reaction method includes: generating an oligomer having an amide acid bond through polymerization at a temperature of not higher than 100° C., suitably not higher than 80° C. for 0.1 to 50 hours, and then, chemically imidizing with an imidizing agent. Another method is composed of two steps, namely, includes further a step of thermal imidization by heating at a high temperature in the range of about 140 to about 270° C. A third method is composed of a single step of conducting polymerization and imidization reaction that starts at a high temperature in the range of 140° C. to 270° C.

Preferred examples of the solvent used in these reactions include organic polar solvents such as N-methyl-2-pyrrolidone, N,N-dimethyl formamide, N,N-dimethyl acetamide, N,N-diethyl acetamide, γ-butyrolactone and N-methyl caprolactam, though the present invention is not limited to these examples.

In the present invention, the addition-reactive group at the terminal of the aromatic imide oligomer is not particularly limited as long as it is a group to undergo a curing reaction (addition polymerization reaction) by heating in production of a resin molded article. From the viewpoint of suitable curing reaction and favorable heat resistance of the cured product, the group is preferably a reactive group selected from the group consisting of a phenylethynyl group, an acetylene group, a nadic acid group, and a maleimide group. Among them, a phenylethynyl group is particularly suitable since the curing reaction does not generate gaseous components and furthermore, the thus obtained resin molded article has excellent heat resistance and also excellent mechanical strength.

These addition-reactive groups are introduced into the terminal of an aromatic imide oligomer suitably by a reaction in which a compound having an anhydride group or an amino group together with an addition-reactive group in the molecule forms an imide ring with an amino group or an acid anhydride group at the terminal of the aromatic imide oligomer.

Examples of the compound having an anhydride group or an amino group together with an addition-reactive group in the molecule that can be suitably used include 4-(2-phenylethynyl)phthalic anhydride, 4-(2-phenylethynyl)aniline, 4-ethynyl-phthalic anhydride, 4-ethynylaniline, nadic anhydride, and maleic anhydride.

An example of the tetracarboxylic acid component to form the aromatic imide oligomer having an addition-reactive group at the terminal is at least one tetracarboxylic dianhydride selected from the group consisting of 2,3,3',4'-biphenyltetracarboxylic dianhydride, 2,2',3,3'-biphenyltetracarboxylic dianhydride, 3,3',4,4'-biphenyltetracarboxylic dianhydride and 3,3',4,4'-benzophenonetetracarboxylic dianhydride. Among them, 2,3,3',4'-biphenyltetracarboxylic dianhydride is used particularly suitably.

Examples of the diamine component to form the aromatic imide oligomer having an addition-reactive group at the terminal include: diamines having one benzene ring such as 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,4-diamine and 3,5-diethyltoluene-2,6-diamine; diamines having two benzene rings such as 4,4'-diaminodiphenyl ether, 3,4'-diaminodiphenyl ether, 3,3'-diaminodiphenyl ether, 3,3'-diaminobenzophenone, 4,4'-diaminobenzophenone, 4,4'-diaminodiphenylmethane, 3,3'-diaminodiphenylmethane, bis (2,6-diethyl-4-aminophenoxy)methane, bis(2-ethyl-6-methyl-4-aminophenyl)methane, 4,4'-methylene-bis(2,6-diethylaniline), 4,4'-methylene-bis(2-ethyl, 6-methylaniline), 2,2-bis(3-aminophenyl)propane, 2,2-bis(4-aminophenyl)propane, benzidine, 2,2'-bis(trifluoromethyl)benzidine, 3,3'-dimethylbenzidine, 2,2-bis(4-aminophenyl)propane and 2,2-bis(3-aminophenyl)propane; diamines having three benzene rings such as 1,3-bis(4-aminophenoxy)benzene, 1,3-bis(3-aminophenoxy)benzene, 1,4-bis(4-aminophenoxy)benzene and 1,4-bis(3-aminophenoxy)benzene; and diamines having four benzene rings such as 2,2-bis[4-[4-aminophenoxy]phenyl]propane and 2,2-bis[4-[4-aminophenoxy]phenyl]hexafluoropropane, though the present invention is not limited to these examples. They may be used alone or in combination of two or more.

It is suitable to use a mixed diamine formed of at least two aromatic diamines selected from the group consisting of 1,3-diaminobenzene, 1,3-bis(4-aminophenoxy)benzene, 3,4'-diaminodiphenyl ether, 4,4'-diaminodiphenyl ether, and 2,2'-bis(trifluoromethyl)benzidine. It is particularly suitable from the viewpoint of heat resistance and moldability to use a mixed diamine as a combination of 1,3-diaminobenzene and 1,3-bis(4-aminophenoxy)benzene, a mixed diamine as a combination of 3,4'-diaminodiphenyl ether and 4,4'-diaminodiphenyl ether, a mixed diamine as a combination of 3,4'-diaminodiphenyl ether and 1,3-bis(4-aminophenoxy) benzene, a mixed diamine as a combination of 4,4'-diaminodiphenyl ether and 1,3-bis(4-aminophenoxy)benzene, and a mixed diamine as a combination of 2,2'-bis(trifluoromethyl) benzidine and 1,3-bis(4-aminophenoxy)benzene.

As for the aromatic imide oligomer having an addition-reactive group at the terminal used in the present invention, the repeating unit of the imide oligomer is suitably in the range of 0 to 20, particularly 1 to 5, and the number average molecular weight in terms of styrene by GPC is suitably not more than 10,000, particularly suitably not more than 3,000. When the number of repeating units is within this range, the melt viscosity can be adjusted to an appropriate range to allow mixing of the functional fiber. Further, since there is no necessity of molding at a high temperature, a resin molded article having excellent moldability together with excellent heat resistance and mechanical strength can be provided.

It is possible to adjust the repeating number of the repeating unit by changing the ratios of the aromatic tetracarboxylic dianhydride, the aromatic diamine, and the compound having an anhydride group or an amino group together with an addition-reactive group in the molecule. By increasing the ratio of the compound having an anhydride group or an amino group together with an addition-reactive group in the molecule, the molecular weight may be reduced and thus the repeating number of the repeating unit becomes small. When the ratio of the compound is reduced, the molecular weight rises so that the repeating number of the repeating unit becomes large.

In the addition-reaction type polyimide resin, a resin additive such as a flame retardant, a colorant, a lubricant, a heat stabilizer, a light stabilizer, an ultraviolet absorber or a filler can be blended according to a known formulation depending on the application of the intended resin molded article.

[Functional Fiber]

In the present invention, any conventionally known functional fiber can be used as the functional fiber to be dispersed in the addition-reaction type polyimide resin, and the examples include a carbon fiber, an aramid fiber, a glass fiber, and a metal fiber. The carbon fiber can be suitably used, and a pitch-based carbon fiber, particularly, a mesophase-type pitch-based carbon fiber can be used suitably.

A carbon fiber having an average fiber length of 50 to 6,000 μm and an average fiber diameter of 5 to 20 μm may be used suitably. When the average fiber length is less than this range, the effect of the carbon fiber as a reinforcing material may not be fully obtained. When the average fiber length exceeds this range, the dispersibility of the fiber in the polyimide resin may deteriorate. When the average fiber diameter is less than this range, the fiber may be expensive and difficult to handle. And when the average fiber diameter exceeds this range, the speed of sedimentation of the functional fiber increases, and the functional fiber tends to be unevenly distributed. In addition, the strength of the fiber tends to decrease, whereby the effect as a reinforcing material may not be fully obtained.

The content of the functional fiber imposes a significant influence on the sliding performance of the resin molded article and warpage during molding. In the present invention, it is suitable that the functional fiber is contained in an amount of 5 to 200 parts by weight, particularly 10 to 150 parts by weight, relative to 100 parts by weight of the addition-reaction type polyimide, so that a molded article having excellent sliding performance and excellent shape stability can be obtained without warpage. When the amount of the functional fiber is smaller than this range, the warpage of the resin molded article may increase. On the other hand, when the amount of the functional fiber is larger than this range, the resin may be thickened excessively and cannot be shaped.

In the present invention, the functional fiber can be contained together with at least one of fine carbon-based materials such as graphite, PTFE, molybdenum disulfide and carbon black, and inorganic materials such as a metal powder such as an aluminum powder and a copper powder. The inorganic material is suitably contained in an amount of 5 to 40 parts by weight, particularly 5 to 30 parts by weight, relative to 100 parts by weight of the addition-reaction type polyimide. If the amount of the inorganic material is smaller than this range, the effect obtained by blending an inorganic material may be insufficient. If the amount of the inorganic material is larger than this range, for instance an increase in friction coefficient and a decrease in abrasion resistance may occur to impair the sliding performance.

(Method for Producing Molding Precursor)

The method for producing a molding precursor of the present invention comprises at least two steps, namely, an impregnation step and a thickening step. In the impregnation step, a prepolymer of an addition-reaction type polyimide resin and a functional fiber are mixed, and the mixture is kept at a temperature not lower than the melting point and not higher than the thickening-start temperature of the addition-reaction type polyimide resin so that the functional fiber is impregnated with the addition-reaction type polyimide resin. In the thickening step, the resin-impregnated fiber is kept at a temperature not lower than the thickening-start temperature of the addition-reaction type polyimide resin, so that the melt viscosity of the resin-impregnated fiber under the conditions of keeping for 1 to 10 minutes at a temperature 5 to 20° C. lower than the thickening-start temperature is raised to the range of 300 to 3200 kPa-s.

As described above, the addition-reaction type polyimide resin used for the molding precursor of the present invention has a low viscosity in the state of the prepolymer before crosslink-curing. Therefore, the functional fiber is likely to settle unless the resin is thickened in the shaping step. In such a case, the functional fiber may not be dispersed uniformly in the prepolymer and warpage may occur. However, the prepolymer thickened in the step of shaping the resin molded article tends to be thermally decomposed to foam and expand. The thus formed bubbles may be crushed by the pressure applied due to the subsequent compression molding, and the resin may flow to cause orientation of the functional fiber. As a result, the resin molded article may be warped.

In the present invention, the impregnation step is followed by the thickening step to previously adjusting the melt viscosity of the prepolymer to the range not to cause sedimentation of the functional fiber at a temperature 15 to 45° C. higher than the thickening-start temperature. In this manner, the uniform dispersion of the functional fiber may be maintained and the thickening process in the shaping step can be omitted to provide a molded article that contains the functional fiber dispersed uniformly therein and that shrinks evenly without warpage.

[Impregnation Step]

In the impregnation step, a prepolymer (imide oligomer) of an addition-reaction type polyimide resin and a functional fiber are mixed. Using an electric furnace or the like, the thus obtained mixture is kept for 30 to 40 minutes at a temperature not lower than the melting point and not higher than the thickening-start temperature of the addition-reaction type polyimide resin, specifically, at a temperature 5 to 20° C. lower than the thickening-start temperature, thereby melting the prepolymer and impregnating the functional fiber with the prepolymer. At this time, as described above, the functional fiber is used in an amount of 5 to 200 parts by weight, particularly 10 to 150 parts by weight, relative to 100 parts by weight of the addition-reaction type polyimide. It is also possible to blend the aforementioned inorganic material of the aforementioned amount.

A conventionally known mixing machine such as a Henschel mixer, a tumbler mixer or a ribbon blender can be used for mixing the prepolymer and the functional fiber. It is particularly suitable to use a batch type pressure kneader because it is important to disperse the functional fiber while preventing the fiber from breakage.

[Thickening Step]

In the thickening step, a resin-impregnated fiber obtained by impregnating the functional fiber with the prepolymer in the impregnation step is kept at a temperature not lower than the thickening-start temperature of the addition-reaction type polyimide resin for a certain time using an electric furnace or the like, thereby increasing the melt viscosity of the resin-impregnated fiber to a range of 300 to 3200 kPa·s. Suitably, it is kept for 40 to 60 minutes at a temperature in a range 30 to 40° C. higher than the thickening-start temperature, so that the melt viscosity of the resin-impregnated fiber under the conditions of keeping for 1 to 10 minutes at a temperature 5 to 20° C. lower than the thickening-start temperature is raised to the range of 300 to 3200 kPa·s.

By keeping the resin-impregnated fiber of the prepolymer and the functional fiber under the aforementioned temperature conditions for a certain time, the prepolymer begins to gradually crosslink, whereby the viscosity is increased. Further, by setting the heating temperature and the keeping time within these ranges, it is possible to increase only the viscosity to the range without completely crosslinking-curing the prepolymer. For this reason, the thickening step is performed at a temperature not lower than the thickening-start temperature of the prepolymer and lower than the temperature at which the prepolymer is completely crosslinked-cured.

In the addition-reaction type polyimide resin, the reaction-start temperature relies on the addition-reactive group. For the polyimide resin of the present invention, which has a phenylethynyl group suitable as an addition-reactive group, desirably the melt viscosity of the resin-impregnated fiber is increased to a range of 300 to 3200 kPa·s by keeping at a temperature of 320±15° C., namely a temperature approximate to the thickening-start temperature, for a certain time.

After the thickening step, the molding precursor obtained by solidifying by cooling (this includes allowing to cool) is a lumpy BMC having a predetermined size in which the functional fiber is uniformly dispersed in the prepolymer. The BMC can be stored over time, and it is excellent in handleability.

(Method for Producing Resin Molded Article)

The method for producing a resin molded article of the present invention comprises at least two steps, namely, a step of pulverizing-mixing a molding precursor as the aforementioned lumpy BMC, and a shaping step of shaping the pulverized product under conditions of a temperature not lower than the thickening-start temperature of the addition-reaction type polyimide resin.

As described above, the molding precursor of the present invention has a melt viscosity in the range of 300 to 3200 kPa·s in a temperature range approximate to the thickening-start temperature of the addition-reaction type polyimide resin. Therefore, in molding of the resin molded article, the pulverized molding precursor can be molded directly at a temperature not lower than the thickening-start temperature of the addition-reaction type polyimide.

In order to uniformize the temperature of the pulverized molding precursor, a preheating step can be performed as required between the pulverizing-mixing step and the shaping step. More specifically, the pulverized product of the molding precursor is introduced into a molding die, and kept in the molding die for a predetermined time at a temperature not lower than the melting temperature and not higher than the thickening-start temperature. Suitably, it is kept for 10 to 30 minutes at a temperature 5 to 20° C. lower than the thickening-start temperature.

[Pulverizing-Mixing Step]

In the pulverizing-mixing step, a molding precursor as a lumpy BMC is pulverized using a pulverizer such as a roll mill or a grinder so as to obtain a powder having a particle diameter of 0.1 to 1000 μm.

[Shaping Step]

The powdery molding precursor is introduced into a molding die. Alternatively, the molding precursor is slightly melted through a preheating step in the molding die. Then, the molding precursor is shaped at a temperature not lower than the thickening-start temperature of the polyimide resin to be used. Specifically, in a case of a polyimide resin having a phenylethynyl group as an addition-reactive group, the molding precursor is shaped at a temperature in the range of 360 to 390° C. so as to be molded as a desired resin molded article. At this time, since the molding precursor of the present invention has a melt viscosity of 300 to 3200 kPa·s under conditions of keeping for 1 to 10 minutes at a temperature 5 to 20° C. lower than the thickening-start temperature of the addition-reaction type polyimide resin in use, the resin is prevented from flowing even if it is pressurized-compressed by compression molding or the like, and the orientation of the functional fiber is also reduced. Namely, curing by applying heat contributes to effective prevention of warpage.

Shaping is suitably carried out by transfer molding or compression molding by pressurizing-compressing a mixture introduced into the molding die. Injection molding or extrusion molding may also be employed.

(Resin Molded Article)

As described above, the resin molded article obtained by shaping the molding precursor of the present invention is a resin molded article comprising an addition-reaction type polyimide resin as a matrix and a functional fiber uniformly dispersed in the matrix. The resin molded article is molded as a disc, a ring or the like in accordance with the application. The article has excellent heat resistance, durability, mechanical strength, and also excellent sliding performance. In addition, since warpage is effectively prevented, the resin molded article has favorable yield, and it has excellent productivity and economic efficiency.

EXAMPLES (Measurement of Warping Degree)

For a circular resin molded article, the warping degree t (mm) and the diameter D (mm) shown in the FIGURE were measured to calculate the rate of warpage/diameter by the Equation (2) below.

$$\text{Warpage/diameter rate } (\%) = t/D \times 100 \qquad (2)$$

t: Molded article warping degree (mm)

D: Molded article diameter (mm)

In the table below, ○ indicates that the warpage/diameter rate is less than 0.16%, and X indicates that the same rate is 0.16% or more.

(Measurement of Thickening-Start Temperature)

The thickening-start temperature of the addition-reaction type polyimide resin to be used was measured with a rheometer. Here, the rate to achieve the target temperature was set to 4° C./min, and after achieving the target temperature, it was kept for 120 minutes. Under the temperature conditions, a parallel plate was used to measure the melt viscosity at an angular frequency of 100 rad/s and a strain of 10%. This was plotted in a semi-logarithmic graph where zero minutes is the time at which the lowest melt viscosity was shown, the horizontal axis indicates time (min) and the vertical axis indicates melt viscosity (Pa·s). A coefficient B of Equation 1 was calculated from an exponential approximation formula. For the addition polymerization polyimide (PETI-330 manufactured by Ube Industries, Ltd.), the value-B was 0.0092 when the target temperature was 285° C. The value-B was 0.0141 when the target temperature was 290° C., and thus, the thickening-starting temperature was set to 290° C.

(Measurement of Melt Viscosity)

The melt viscosity at a temperature 5° C. to 20° C. lower than the thickening-start temperature of the addition-reaction type polyimide resin to be used was measured by using a rheometer (ARES-G2 manufactured by TA instruments). Specifically, the melt viscosity was measured using a parallel plate, with a strain of 1% (measurement gap: 1 mm) and an angular frequency range in the range of 0.1 to 100 rad/s, and the melt viscosity at 0.1 rad/s was set as the measurement value. In the measurement, the powdery molding precursor was applied with heat and pressure by using a hot press at a temperature 10 to 40° C. lower than the thickening-start temperature so as to be formed as a smooth sheet.

Example 1

Into 100 parts by weight of the addition-reaction type polyimide (PETI-330 manufactured by Ube Industries, Ltd.), 42.9 parts by weight of a mesophase type pitch-based carbon fiber (K223HM manufactured by Mitsubishi Plastics Co., Ltd.) having an average monofiber length of 200 μm was introduced and dry-blended to prepare a mixture. This mixture was kept in an electric furnace at 280° C. for 40 minutes, and further kept for 40 minutes at a temperature in the range of 320 to 330° C. Thereafter, the mixture was quenched to room temperature (bulk molding compound, hereinafter this may be referred to as BMC). The thus-obtained BMC was pulverized-mixed by using a pulverizer and fed to a compression molding die to be preheated at 280° C. for 10 minutes. And then, the temperature was raised to 371° C. at a rate of 3° C./min while applying pressure of 3.0 MPa. After keeping for 60 minutes, the BMC was cooled slowly to obtain a sheet having a diameter of 200 mm and a thickness of 3 mm.

Example 2

The same procedure as in Example 1 was carried out except that the time for keeping in the electric furnace at the temperature in the range of 320 to 330° C. was changed to 45 minutes.

Example 3

The same procedure as in Example 1 was carried out except that the time for keeping in the electric furnace at the temperature in the range of 320 to 330° C. was changed to 50 minutes.

Example 4

The same procedure as in Example 1 was carried out except that the time for keeping in the electric furnace at the temperature in the range of 320 to 330° C. was changed to 60 minutes.

Comparative Example 1

The same procedure as in Example 1 was carried out except that the time for keeping in the electric furnace at the temperature in the range of 320 to 330° C. was changed to 35 minutes.

Comparative Example 2

The same procedure as in Example 1 was carried out except that the time for keeping in the electric furnace at the temperature in the range of 320 to 330° C. was changed to 62.5 minutes. Due to the high resin viscosity, it was impossible to sufficiently crush to the desired thickness.

Comparative Example 3

The same procedure as in Example 1 was carried out except that the time for keeping in the electric furnace at the temperature in the range of 320 to 330° C. was changed to 65 minutes. Due to the high resin viscosity, it was impossible to sufficiently crush to the desired thickness.

Comparative Example 4

The same procedure as in Example 1 was carried out except that the time for keeping in the electric furnace at the temperature in the range of 320 to 330° C. was changed to 70 minutes. Due to the high resin viscosity, it was impossible to sufficiently crush to the desired thickness.

Table 1 shows the measurement results of the shaping performance, the melt viscosity, and the warpage/diameter rate of the BMC in each of Examples 1-5 and Comparative Examples 1-3.

TABLE 1

| | Com. Ex. 1 | Ex. 1 | Ex. 2 | Ex. 3 | Ex. 4 | Com. Ex. 2 | Com. Ex. 3 | Com. Ex. 4 |
|---|---|---|---|---|---|---|---|---|
| Keeping time (min)* | 35 | 40 | 45 | 50 | 60 | 62.5 | 65 | 70 |
| Shaping property | X Leakage | ○ | ○ | ○ | ○ | X Shaping impossible | X Shaping impossible | X Shaping impossible |
| Warpage/diameter rate (%) | X 1.03 | ○ 0.13 | ○ 0.09 | ○ 0.11 | ○ 0.12 | X Not measurable | X Not measurable | X Not measurable |
| Melt viscosity (kPa · s) | 287 | 360 | 767 | 1875 | 3148 | 3432 | 4750 | 9848 |

*Time to keep at a temperature of 320 to 330° C. in the thickening step
Ex.: Example,
Com. Ex.: Comparative Example

INDUSTRIAL APPLICABILITY

The molding precursor of the present invention can be used to mold a fiber-reinforced polyimide resin molded article excellent in heat resistance, durability, mechanical strength, and sliding performance with good shape stability as a result of effective prevention of warpage, and thus, it can be used as a slidable member for various applications in the automotive, electric and electronic fields.

The invention claimed is:

1. A molding precursor, comprising:
   a functional fiber impregnated with a polyimide resin having an addition-reactive group at its terminal,
   the molding precursor having a melt viscosity adjusted to a range of 300 to 3200 kPa·s under conditions of keeping for 1 to 10 minutes at a temperature 5 to 20° C. lower than a thickening-start temperature of the polyimide resin.

2. The molding precursor according to claim 1, wherein the polyimide resin is a polyimide resin having a phenylethynyl group as an addition-reactive group.

3. The molding precursor according to claim 1, wherein the functional fiber is contained in an amount of 5 to 200 parts by weight relative to 100 parts by weight of the polyimide resin.

4. The molding precursor according to claim 1, wherein the functional fiber is at least one selected from the group consisting of a carbon fiber, a glass fiber, an aramid fiber, and a metal fiber.

5. The molding precursor according to claim 1, wherein the functional fiber is a carbon fiber having an average fiber length in a range of 50 to 6000 μm and an average fiber diameter in a range of 5 to 20 μm.

6. The molding precursor according to claim 1, further comprising at least one of graphite, molybdenum disulfide, PTFE (polytetrafluoroethylene) resin, a fine carbon-based material, or a metal powder in an amount of 5 to 40 parts by weight relative to 100 parts by weight of the polyimide resin.

7. A method for producing a resin molded article, comprising pulverizing-mixing the molding precursor according to claim 1 so as to prepare a pulverized product, and shaping the pulverized product under conditions of a temperature not lower than the thickening-start temperature of the addition-reaction type polyimide resin.

8. The method for producing a resin molded article according to claim 7, further comprising preheating between the pulverizing-mixing and the shaping, the preheating comprises keeping the pulverized product of the molding precursor for a predetermined time at a temperature not lower than the melting temperature and not higher than the thickening-start temperature.

9. The method for producing a resin molded article according to claim 7, wherein the shaping is performed by compression molding.

10. A resin molded article obtained by shaping the molding precursor according to claim 1, wherein the addition-reaction type polyimide resin is a matrix, and the functional fiber is dispersed in the matrix.

11. A method for producing a molding precursor, the method comprising at least impregnation and thickening,
    the impregnation comprises: preparing a mixture of a prepolymer of a polyimide resin having an addition-reactive group at its terminal and a functional fiber, keeping the mixture at a temperature not lower than the melting point and not higher than the thickening-start temperature of the polyimide resin so as to impregnate the functional fiber with the polyimide resin and obtain a resin-impregnated fiber; and
    the thickening comprises: keeping the resin-impregnated fiber at a temperature not lower than the thickening-start temperature of the polyimide resin so as to increase melt viscosity of the resin-impregnated fiber to a range of 300 to 3200 kPa·s under conditions of keeping for 1 to 10 minutes at a temperature 5 to 20° C. lower than the thickening-start temperature.

12. The method for producing a molding precursor according to claim 11, wherein the melt viscosity of the resin-impregnated fiber is increased to a range of 300 to 3200 kPa·s by keeping the resin-impregnated fiber for a certain time at a temperature 15 to 45° C. higher than the thickening-start temperature of the polyimide resin.

13. The method for producing a molding precursor according to claim 11, wherein the functional fiber is contained in an amount of 5 to 200 parts by weight relative to 100 parts by weight of the polyimide resin.

14. The method for producing a molding precursor according to claim 11, wherein the polyimide resin is a polyimide resin having a phenylethynyl group as an addition-reactive group.

* * * * *